US010286725B2

(12) United States Patent
Celik et al.

(10) Patent No.: US 10,286,725 B2
(45) Date of Patent: May 14, 2019

(54) NON-PNEUMATIC SUPPORT STRUCTURE

(71) Applicant: The Goodyear Tire & Rubber Company, Akron, OH (US)

(72) Inventors: Ceyhan Celik, Stow, OH (US); Steven Amos Edwards, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 185 days.

(21) Appl. No.: 15/465,639

(22) Filed: Mar. 22, 2017

(65) Prior Publication Data

US 2018/0272799 A1    Sep. 27, 2018

(51) Int. Cl.
| | |
|---|---|
| *B60B 9/04* | (2006.01) |
| *B60B 9/26* | (2006.01) |
| *B60C 7/12* | (2006.01) |
| *B60C 7/18* | (2006.01) |
| *B60C 7/14* | (2006.01) |

(52) U.S. Cl.
CPC .................. *B60B 9/04* (2013.01); *B60B 9/26* (2013.01); *B60C 7/125* (2013.01); *B60C 7/14* (2013.01); *B60C 7/18* (2013.01); *B60B 2360/32* (2013.01); *B60B 2900/311* (2013.01); *B60B 2900/313* (2013.01); *B60C 2007/146* (2013.01)

(58) Field of Classification Search
CPC ....... B60B 9/04; B60B 9/26; B60B 2900/313; B60B 2900/311; B60B 2360/32; B60C 7/14; B60C 7/125; B60C 7/18; B60C 2007/145
USPC ......................................................... 152/11
See application file for complete search history.

(56) References Cited

U.S. PATENT DOCUMENTS

| | | |
|---|---|---|
| 479,255 A | 7/1892 | Dunlop |
| 482,175 A | 9/1892 | Hollafolla |
| 1,002,003 A | 8/1911 | Simonson |
| 1,233,722 A | 7/1917 | Smith |
| 1,389,285 A | 8/1921 | Althoff |
| 1,451,517 A | 4/1923 | Smith |
| 1,930,764 A | 10/1933 | Mallory |
| 3,493,027 A | 2/1970 | Dewhirst |
| 4,226,273 A | 10/1980 | Long |
| 4,235,270 A | 11/1980 | Kahaner |
| 4,602,823 A | 7/1986 | Berg |
| 5,343,916 A | 9/1994 | Duddey |

(Continued)

OTHER PUBLICATIONS

European Search Report dated Jul. 19, 2018 for Application Serial No. EP18163079.

(Continued)

*Primary Examiner* — S. Joseph Morano
*Assistant Examiner* — Jean W Charleston
(74) *Attorney, Agent, or Firm* — Robert N. Lipcsik

(57) ABSTRACT

A wheel and tire assembly for a mobile vehicle in accordance with the present invention includes an inner central rim, a flexible ring mounted on the inner central rim, and a spoke structure extending between the inner central rim and the flexible ring. The spoke structure defines a plurality of cavities and alternating radially extending openings disposed concentrically about the inner central rim and allowing the flexible ring to deflect under load. The spoke structure further defines a plurality of triangular openings disposed at the flexible ring and between the cavities and the inlet openings.

3 Claims, 4 Drawing Sheets

(56) References Cited

U.S. PATENT DOCUMENTS

| | | | |
|---|---|---|---|
| 5,800,643 A | 9/1998 | Frankowski | |
| 6,068,721 A | 5/2000 | Dyer | |
| 6,260,598 B1 | 7/2001 | Tanaka | |
| 8,962,120 B2 | 2/2015 | Delfino | |
| 9,387,726 B2* | 7/2016 | Choi | B60C 7/18 |
| 2003/0201043 A1* | 10/2003 | Adams | B60B 9/00 |
| | | | 152/5 |
| 2004/0069385 A1 | 4/2004 | Timoney | |
| 2006/0144488 A1* | 7/2006 | Vannan | B60C 7/10 |
| | | | 152/7 |
| 2010/0193097 A1 | 8/2010 | McNier | |
| 2012/0205017 A1* | 8/2012 | Endicott | B60B 1/0223 |
| | | | 152/1 |
| 2018/0001704 A1* | 1/2018 | Reinhardt | B60C 7/102 |

OTHER PUBLICATIONS

U.S. Appl. No. 15/351,672, filed Nov. 15, 2016.
U.S. Appl. No. 15/351,687, filed Nov. 15, 2016.
U.S. Appl. No. 15/351,706, filed Nov. 15, 2016.
U.S. Appl. No. 15/351,717, filed Nov. 15, 2016.
U.S. Appl. No. 15/351,727, filed Nov. 15, 2016.

* cited by examiner

NON-PNEUMATIC SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires are limited. It is an object of the present invention to overcome this limitation and increase the load carrying capacity and durability of these spokes and hence the performance of the top loader non-pneumatic tire.

SUMMARY OF THE INVENTION

A wheel and tire assembly for a mobile vehicle in accordance with the present invention includes an inner central rim, a flexible ring mounted on the inner central rim, and a spoke structure extending between the inner central rim and the flexible ring. The spoke structure defines a plurality of cavities and alternating radially extending openings disposed concentrically about the inner central rim and allowing the flexible ring to deflect under load. The spoke structure further defines a plurality of triangular openings disposed at the outer flexible ring and between the cavities and the inlet openings.

According to another aspect of the assembly, the spoke structure comprises a polymer material.

According to still another aspect of the assembly, the spoke structure comprises a homogenous polymer material.

According to yet another aspect of the assembly, each cavity of the plurality of cavities has a common radial dimension.

According to still another aspect of the assembly, each cavity of the plurality of cavities has a common axial length equal to a uniform axial thickness of the spoke structure.

According to yet another aspect of the assembly, the assembly further comprises a reinforcing layer interlaced circumferentially and radially about the plurality of cavities and alternating openings for further tuning the flexibility/stiffness of the structure.

According to still another aspect of the assembly, the spoke structure comprises a uniform rubber material.

A method in accordance with the present invention non-pneumatically supports a mobile vehicle. The method includes the steps of: rotating an inner central rim about a horizontal axis; mounting the inner central rim on to a flexible ring; extending a spoke structure axially and radially between the inner central rim and the flexible ring; defining a plurality of axially extending cavities and alternating radially extending openings concentrically about the inner central rim; defining a plurality of triangular openings disposed at the outer flexible ring and between the cavities and the inlet openings; and vertically loading the flexible ring such that the flexible ring and a part of the spoke structure adjacent to the flexible ring both deflect vertically.

According to another aspect of the method, the spoke structure comprises a polymer material.

According to still another aspect of the method, the spoke structure comprises a homogenous polymer material.

According to yet another aspect of the method, each cavity of the plurality of cavities has a common radial dimension.

According to still another aspect of the method, each cavity of the plurality of cavities has a common axial length equal to a uniform axial thickness of the spoke structure.

According to yet another aspect of the method, another step interlaces a reinforcing layer circumferentially and radially about the plurality of cavities for further tuning the flexibility/stiffness of the spoke structure.

According to yet another aspect of the method, other steps tune the flexibility/stiffness of the spoke structure and interlace a reinforcing layer circumferentially and radially about the plurality of cavities.

According to still another aspect of the method, the spoke structure comprises a uniform rubber material.

According to yet another aspect of the method, another step buckles the spoke structure at a predetermined load on the spoke structure.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

Figure 1:
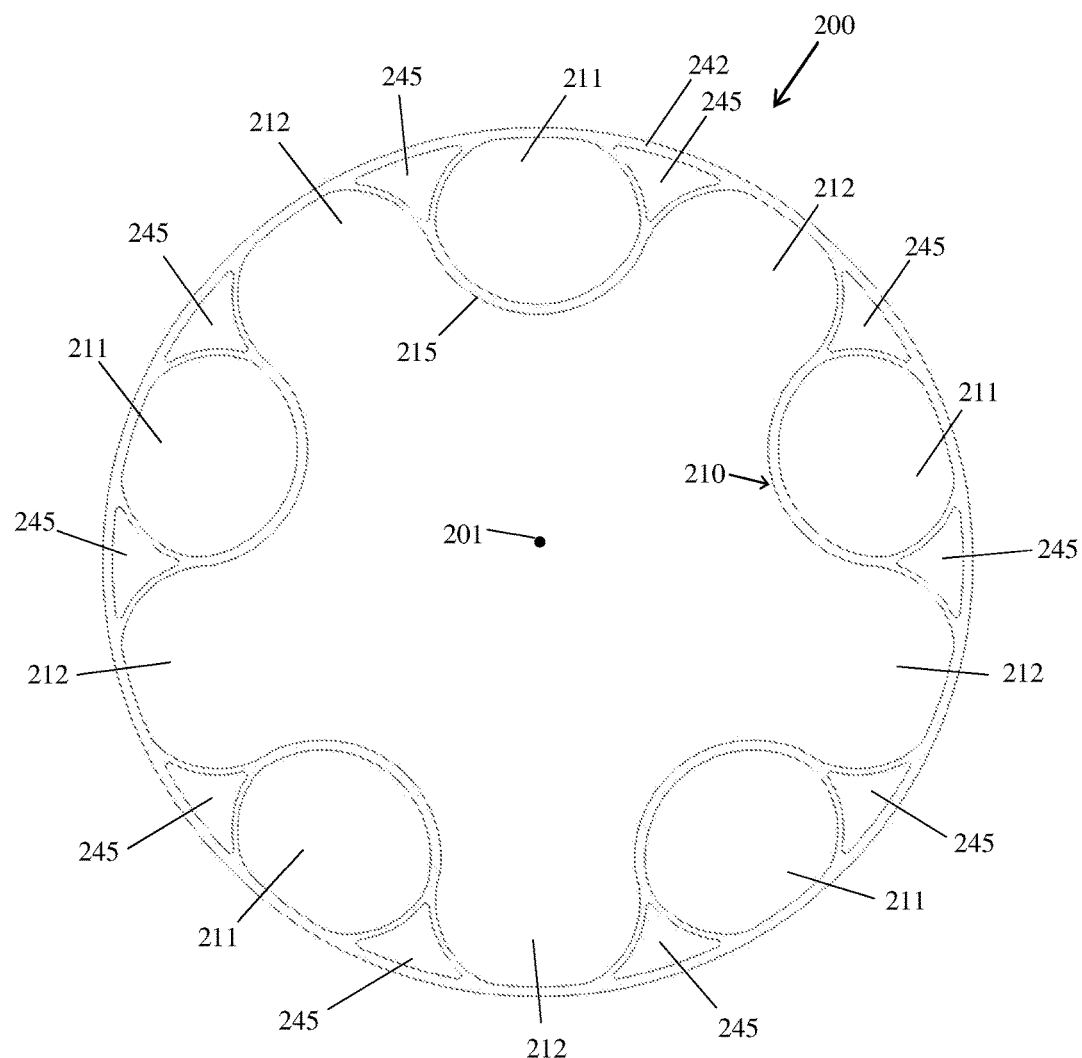
FIG. 1 is a schematic view of an example assembly in accordance with the present invention.

A conventional wheel/tire assembly, such as that described in U.S. application Ser. No. 15/351,672 to applicant Goodyear and inventor C. Celik, incorporated herein by reference in its entirety, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly may have an inner central rim, such as an automobile wheel, and a circular outer flexible ring, which may include a shear band and tread structure, mounted on the inner central rim by a continuous cord/fabric reinforced spoke structure extending between the inner central rim and the outer ring.

The spoke structure may define a plurality of cavities disposed concentrically about the inner central rim allowing the spoke structure to deflect under load thereby defining a suitable balance between flexibility for ride comfort and traction within a footprint of the assembly and stiffness for vehicle handling, low rolling resistance, and low heat build-up within the spoke structure. The cavities of the spoke structure may further define openings for arms of the inner central rim to extend therethrough and secure the spoke structure to the inner central rim. The arms may engage portions of the spoke structure in a mechanical interlocking arrangement. The inner central rim may further include plates that, along with the arms may sandwich the portions of the spoke structure and create a further frictional and/or adhesive securement between the inner central rim and the spoke structure. The spoke structure may comprise a homogenous or heterogeneous polymer and/or a filled polymer.

Spokes of the spoke structure may be curved inwardly or outwardly for mitigating or enhancing buckling of the spokes. The spokes may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The spokes may be oriented at angle between 0 degrees and 90 degrees. The spokes may be continuously reinforced across their entire axial length. Continuous reinforcement layer(s) may extend radially outward to multiple locations adjacent to a shear band at the outer flexible ring.

Each cavity may have a common cross sectional profile about the axis of rotation of the assembly. Further, each cavity may have a common axial length equal to a uniform axial thickness of the spoke structure. Each cavity may be curvedly shaped to prevent "pinch" points on the reinforcement layer(s) and mitigate compressive stress concentrations on the reinforcement layer(s). The number of cavities may be between 2 and 60 for large scale assemblies. The inner central rim may include steel, cast iron, aluminum, aluminum alloys, magnesium allows, and/or iron alloys.

Another conventional wheel/tire assembly, such as that described in U.S. application Ser. No. 15/351,672 to applicant Goodyear and inventor C. Celik, incorporated herein by reference in its entirety, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly may have an inner central rim, such as an automobile wheel, and a circular outer flexible ring, which may include a shear band and tread structure, mounted on the inner central rim by a continuous cord/fabric reinforced spoke structure extending between the inner central rim and the outer ring.

The spoke structure may define a plurality of alternating cavities and inlet openings disposed concentrically about the inner central rim allowing the spoke structure to deflect under load thereby defining a suitable balance between flexibility for ride comfort and traction within a footprint of the assembly and stiffness for vehicle handling, low rolling resistance, and low heat build-up within the spoke structure. The cavities of the spoke structure may further define openings for arms of the inner central rim to extend therethrough and secure the spoke structure to the inner central rim. The arms may engage portions of the spoke structure in a mechanical interlocking arrangement. The inner central rim may further include plates that, along with the arms may sandwich the portions of the spoke structure and create a further frictional and/or adhesive securement between the inner central rim and the spoke structure. The spoke structure may comprise a homogenous or heterogeneous polymer and/or a filled polymer.

Spokes of the spoke structure may be curved inwardly or outwardly for mitigating or enhancing buckling of the spokes. The spokes may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The reinforcement in the spokes may be oriented at angle between 0 degrees and 90 degrees. The spokes may be continuously reinforced across their entire axial length. Continuous reinforcement layer(s) may extend radially outward to multiple locations adjacent to a shear band at the outer flexible ring.

Each cavity and inlet opening may have a common cross sectional profile about the axis of rotation of the assembly. Further, each cavity and inlet opening may have a common axial length equal to a uniform axial thickness of the spoke structure. Each cavity may be curvedly shaped to prevent "pinch" points on the reinforcement layer(s) and mitigate compressive stress concentrations on the reinforcement layer(s). The number of cavities may be between 2 and 60 for large scale assemblies. The inner central rim may include steel, cast iron, aluminum, aluminum alloys, magnesium allows, iron alloys, plastics, and/or composites. The spoke structure may further have additional cavities for further adjusting the flexibility of the spoke structure.

Figure 2:
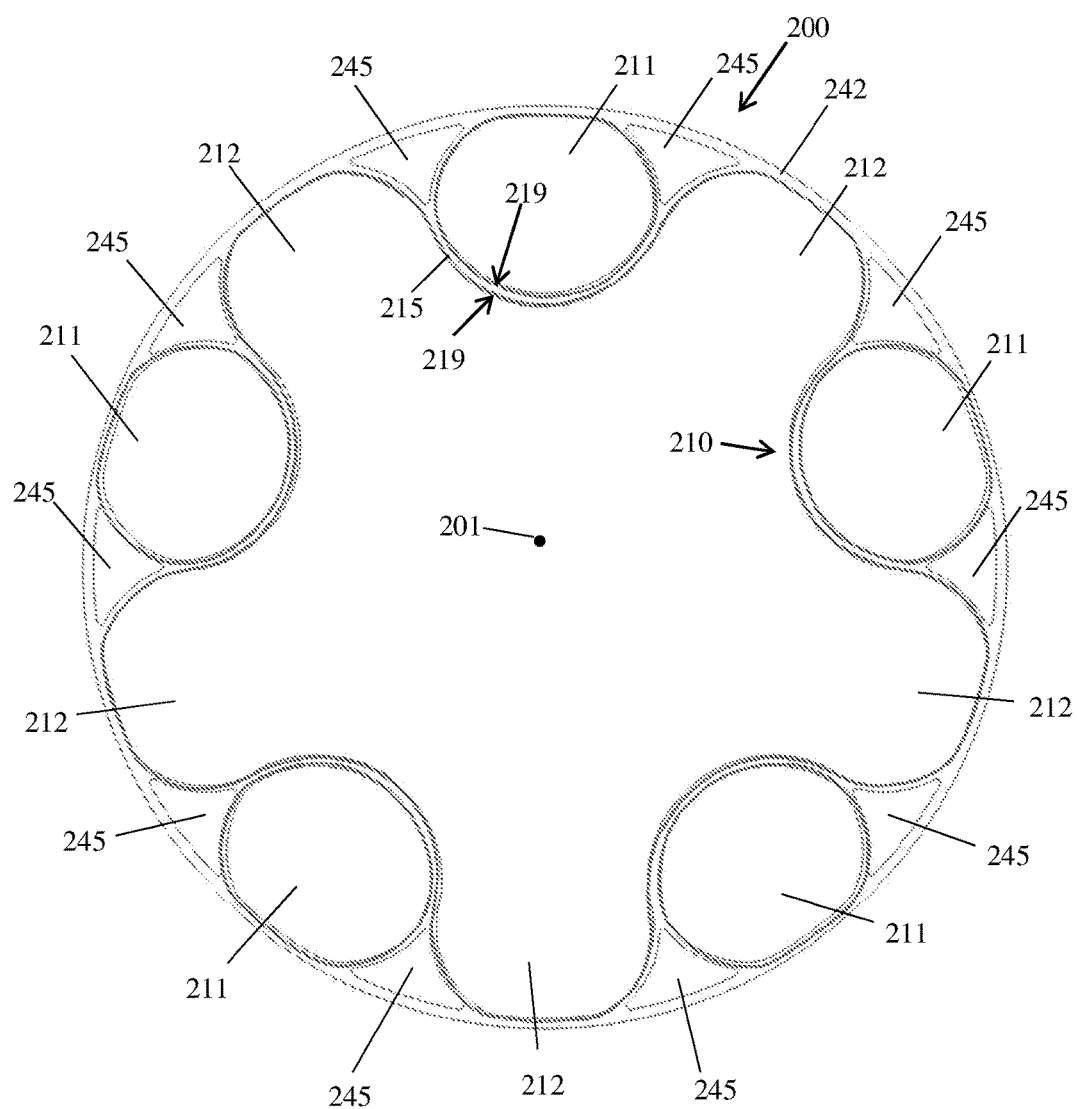
FIG. 2 is a schematic view of the assembly of FIG. 1 under a different condition.
Figure 3:
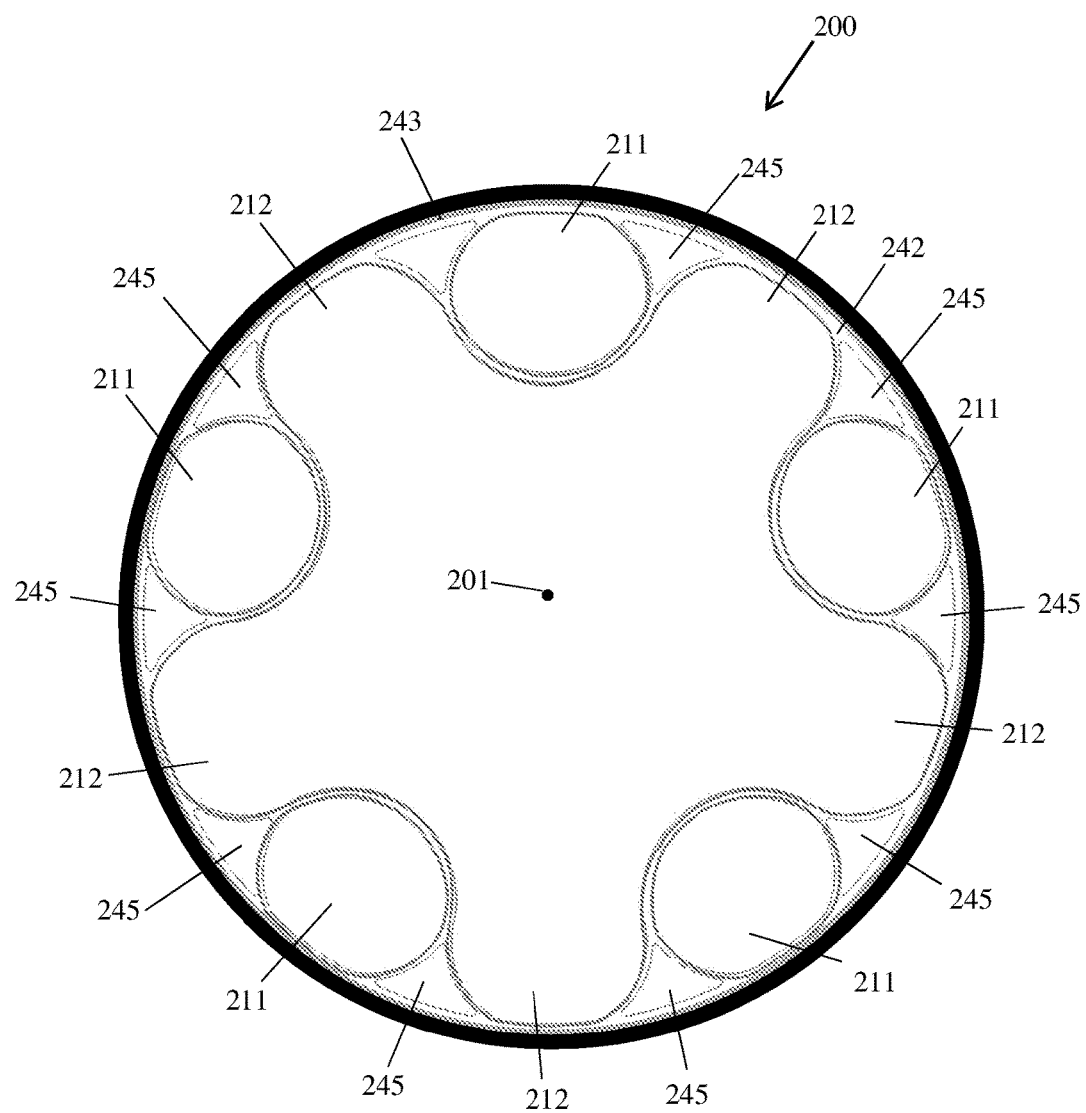
FIG. 3 is a schematic view of the assembly of FIG. 2 under a still different condition.

As shown in FIGS. 1-3, an example wheel/tire assembly 200 in accordance with the present invention may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly 200 may have an inner central rim, such as an automobile wheel as described above, and a circular outer flexible ring 242, which may include a shear band 243 with a tread structure, mounted on the inner central rim by a continuous cord/fabric reinforced spoke structure 210 extending between the inner central rim and the outer flexible ring.

As shown in FIGS. 1-3, the spoke structure 210 may define a plurality of alternating oval-like closed cavities 211 and open rectangular inlet openings 212 disposed concentrically about the inner central rim allowing the spoke structure to deflect under load thereby defining a suitable balance between flexibility for ride comfort and traction within a footprint of the assembly 200 and stiffness for vehicle handling, low rolling resistance, and low heat build-up within the spoke structure. The spoke structure 210 may further define a plurality of triangular openings 245 disposed at the outer flexible ring 242 and between the cavities 211 and the inlet openings 212 (FIG. 1).

The cavities 211 of the spoke structure 210 may further define openings for arms of the inner central rim to extend therethrough and secure the spoke structure to the inner central rim, as described above. The arms may engage portions of the spoke structure 210 in a mechanical interlocking arrangement. The inner central rim may further include plates that, along with the arms may sandwich portions of the spoke structure 210 and create a further frictional and/or adhesive securement between the inner central rim and the spoke structure. The spoke structure 210 may comprise a homogenous or heterogeneous polymer and/or a filled polymer.

Spokes 215 of the spoke structure 210 may be curved inwardly or outwardly for mitigating or enhancing buckling of the spokes. The spokes 215 may include one or more reinforcing layers 219. The layer(s) 219 may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be between 400 denier to 9000 denier. The polymeric film may be from 0.1 mm to 2.0 mm thick. The reinforcement in the spokes 215 may be oriented at angle between 0 degrees and 90 degrees. The spokes 215 may be continuously reinforced across their entire axial length. Continuous reinforcement layer(s) 219 (FIG. 2) may extend radially outward to multiple locations adjacent to a shear band 243 at the outer flexible ring 242 (FIG. 3). Other reinforcement layers 219 may extend about the interior of the closed cavities 211. The continuous reinforcement layer(s) 219 may be integrated into the spoke structure 210 and the outer flexible ring 242. Alternatively, the shear band 243 may be attached to the spoke structure 210 by between 10 and 40 connection points (e.g., adhesive, fused, welded, etc.).

Each cavity 211 and inlet opening 212 may have a common cross sectional profile about the axis of rotation of the assembly. Further, each cavity 211 and inlet opening 212 may have a common axial length equal to a uniform axial thickness of the spoke structure 210. Each cavity 211 may be curvedly shaped to prevent "pinch" points on the reinforcement layer(s) 219 and mitigate compressive stress concentrations on the reinforcement layer(s). The number of cavities 211 may be between 2 and 60 for large scale assemblies 200.

Figure 4:
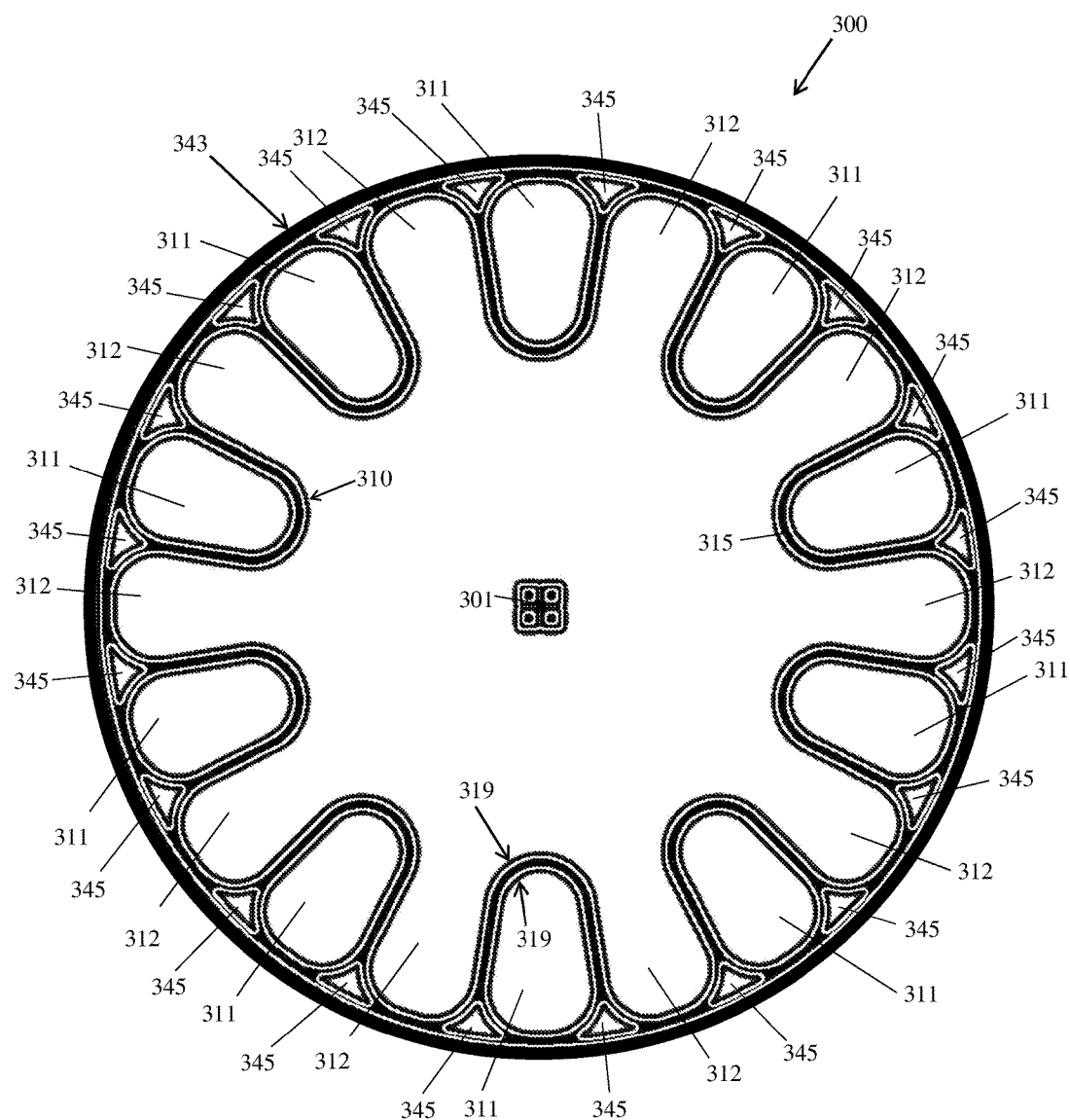
FIG. 4 is a schematic view of another example assembly in accordance with the present invention.

As shown in FIG. 4, another example wheel/tire assembly 300 in accordance with the present invention may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly 300 may have an inner central rim, such as an automobile wheel as described above, and a circular outer flexible ring 342, which may include a shear band 343 with a tread structure, mounted on the inner central rim by a continuous cord/fabric reinforced spoke structure 310 extending between the inner central rim and the outer flexible ring.

As shown in FIG. 4, the spoke structure 310 may define a plurality of alternating closed egg-shaped cavities 311 and open rectangular inlet openings 312 disposed concentrically about the inner central rim allowing the spoke structure to deflect under load thereby defining a suitable balance between flexibility for ride comfort and traction within a footprint of the assembly 300 and stiffness for vehicle handling, low rolling resistance, and low heat build-up within the spoke structure. The spoke structure 310 may further define a plurality of triangular openings 345 disposed at the outer flexible ring 342 and between the cavities 311 and the inlet openings 312 (FIG. 4).

The cavities 311 of the spoke structure 310 may further define openings for arms of the inner central rim to extend therethrough and secure the spoke structure to the inner central rim, as described above. The arms may engage portions of the spoke structure 310 in a mechanical interlocking arrangement. The inner central rim may further include plates that, along with the arms may sandwich portions of the spoke structure 310 and create a further frictional and/or adhesive securement between the inner central rim and the spoke structure. The spoke structure 310 may comprise a homogenous or heterogeneous polymer and/or a filled polymer.

Spokes 315 of the spoke structure 310 may be curved inwardly or outwardly for mitigating or enhancing buckling of the spokes. The spokes 315 may include one or more reinforcing layers 319. The layer(s) 319 may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be between 400 denier to 9000 denier. The polymeric film may be from 0.1 mm to 2.0 mm thick. The reinforcement in the spokes 315 may be oriented at angle between 0 degrees and 90 degrees. The spokes 315 may be continuously reinforced across their entire axial length. Continuous reinforcement layer(s) 319 may extend radially outward to multiple locations adjacent to a shear band 343 at the outer flexible ring 342. Other reinforcement layers 319 may extend about the interior of the closed cavities 311. The continuous reinforcement layer(s) 319 may be integrated into the spoke structure 310 and the outer flexible ring 342 (not shown). Alternatively, the shear band 343 may be attached to the spoke structure 310 by between 20 and 60 connection points (e.g., adhesive, fused, welded, etc.).

Each cavity 311 and inlet opening 312 may have a common cross sectional profile about the axis of rotation of the assembly. Further, each cavity 311 and inlet opening 312 may have a common axial length equal to a uniform axial thickness of the spoke structure 310. Each cavity 311 may be curvedly shaped to prevent "pinch" points on the reinforcement layer(s) 319 and mitigate compressive stress concentrations on the reinforcement layer(s). The number of cavities 311 may be between 15 and 60 for large scale assemblies 200.

Variations in the present invention are possible in light of the description of it provided herein. While certain representative examples and details have been shown for the purpose of illustrating the subject invention, it will be apparent to those skilled in this art that various changes and modifications can be made therein without departing from the scope of the subject invention. It is, therefore, to be understood that changes can be made in the particular examples described which will be within the full scope of the present invention as defined by the following appended claims. Further, the present invention is not limited to the examples hereinbefore described which may be varied in both construction and detail within the full scope of the appended claims.

What is claimed:
1. A wheel for a mobile vehicle comprising:
an outer flexible ring mounted to an inner central rim; and
a spoke structure extending radially between the central rim and the flexible ring, the spoke structure defining a plurality of closed cavities and an alternating plurality of radially extending openings disposed concentrically about the inner central rim and allowing the flexible ring to deflect under load, the spoke structure further defining a plurality of triangular openings disposed at the outer flexible ring and between the cavities and the inlet openings, the spoke structure comprising a uniform rubber material.

2. The wheel as set forth in claim 1 wherein each cavity of the plurality of closed cavities has a common radial dimension.

3. The wheel as set forth in claim 1 wherein each cavity of the plurality of closed cavities has a common axial length equal to a uniform axial thickness of the spoke structure.

* * * * *